(12) United States Patent
Almotlaq et al.

(10) Patent No.: US 10,190,802 B1
(45) Date of Patent: Jan. 29, 2019

(54) SOLAR HEATING APPARATUS

(71) Applicants: KING SAUD UNIVERSITY, Riyadh (SA); QUDRA ENERGY COMPANY, Riyadh (SA)

(72) Inventors: Yousef Abdullah Almotlaq, Riyadh (SA); Mazen Abdullah Baabbad, Riyadh (SA); Hany Abdulrahman Alansary, Riyadh (SA); Essam Abdulaziz Al Ammar, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 15/786,449

(22) Filed: Oct. 17, 2017

(51) Int. Cl.
*F24S 30/452* (2018.01)
*F24S 50/20* (2018.01)
*F24S 30/00* (2018.01)

(52) U.S. Cl.
CPC .............. *F24S 30/452* (2018.05); *F24S 50/20* (2018.05); *F24S 2030/133* (2018.05); *F24S 2030/134* (2018.05); *F24S 2030/135* (2018.05)

(58) Field of Classification Search
CPC ........... F24S 2030/131; F24S 2030/136; F24S 2030/133
See application file for complete search history.

(56) References Cited

U.S. PATENT DOCUMENTS 3,872,854 A * 3/1975 Raser ...................... F24S 23/77
126/606
4,068,653 A * 1/1978 Bourdon ............... G01S 3/7861
126/578
4,102,326 A 7/1978 Sommer
4,116,539 A 9/1978 Evans
4,137,899 A * 2/1979 Weslow .................. F24S 23/30
126/649
4,215,410 A * 7/1980 Weslow ................. G05D 3/105
700/61
4,276,872 A 7/1981 Blake et al.
4,299,445 A 11/1981 Aucouturier
4,317,031 A 2/1982 Findell
4,345,582 A * 8/1982 Aharon ................... F24S 23/70
126/574
4,365,618 A * 12/1982 Jones .................... F24S 30/455
126/576

(Continued)

FOREIGN PATENT DOCUMENTS

WO   WO 2013/079824 A1   6/2013

*Primary Examiner* — Kenneth Rinehart
*Assistant Examiner* — Deepak Deean
(74) *Attorney, Agent, or Firm* — Richard C. Litman

(57) ABSTRACT

The solar heating apparatus includes at least one optical element and a drive assembly for selectively moving the at least one optical element along multiple axes of rotation, the drive assembly having an elevation shaft and an azimuth rotation shaft. The solar heating apparatus also includes a support frame positioned in communicating relation with the drive assembly, the support frame being configured for supporting the at least one optical element. The support frame includes a main shaft, at least one branch holder pivotally attached to an end of the main shaft, the at least one branch holder being adapted for supporting the at least one optical element, and at least one belt drive for pivoting the at least one branch holder, the at least one belt drive being actuated by the elevation shaft.

11 Claims, 7 Drawing Sheets

(56) References Cited

U.S. PATENT DOCUMENTS

| | | | | |
|---|---|---|---|---|
| 4,368,962 A | * | 1/1983 | Hultberg | F24S 30/458 |
| | | | | 353/3 |
| 4,572,161 A | * | 2/1986 | Mori | F24S 30/452 |
| | | | | 126/600 |
| 4,870,949 A | * | 10/1989 | Butler | F24S 23/71 |
| | | | | 126/571 |
| 5,325,844 A | * | 7/1994 | Rogers | F24S 30/458 |
| | | | | 126/605 |
| 8,000,014 B2 | | 8/2011 | Whitehead et al. | |
| 8,322,332 B2 | * | 12/2012 | Rogers | F24S 30/458 |
| | | | | 126/600 |
| 9,441,858 B2 | | 9/2016 | Ba-abbad et al. | |
| 2005/0034751 A1 | | 2/2005 | Gross et al. | |
| 2005/0217665 A1 | * | 10/2005 | Luconi | F24S 25/634 |
| | | | | 126/696 |
| 2007/0070531 A1 | | 3/2007 | Lu | |
| 2012/0125404 A1 | | 5/2012 | Ramos | |

\* cited by examiner

SOLAR HEATING APPARATUS

BACKGROUND OF THE INVENTION

1. Field

The present invention relates to solar collectors, and particularly to a solar heating apparatus having an array of mirrors arranged in rows and columns that can be adjusted for solar tracking of the sun in azimuth and elevation.

2. Description of the Related Art

Concentrated solar power systems generate solar power by using optical elements, such as mirrors or lenses, to concentrate sunlight or solar thermal energy onto a small area, such as a fixed receiver. Electricity is generated when the concentrated light is converted to heat, which drives a heat engine (typically a steam turbine) connected to an electrical power generator or powers a thermochemical reaction. Heat storage in molten salts allows some solar thermal plants to continue to generate after sunset and adds value to such systems when compared to photovoltaic panels.

Parabolic trough reflectors for solar concentrators are formed from a linear parabolic reflector that concentrates light onto a fixed receiver positioned along the reflector's focal line. The fixed receiver is a tube positioned directly above the middle of the parabolic mirror and filled with a working fluid. The reflector follows the sun during daylight hours by tracking along a single axis. A working fluid (e.g., molten salt) is heated to between 150-350° C. as it flows through the fixed receiver and is then used as a heat source for a power generation system. Numerous control and tracking systems exist for driving parabolic trough reflectors to rotate according to the position of the sun, as well as solar radiation availability under changing weather conditions.

A solar power tower, on the other hand, includes an array of dual-axis tracking reflectors (commonly referred to as heliostats) that concentrate sunlight on a central fixed receiver atop a tower. The fixed receiver contains a fluid deposit, such as seawater. Optically, a solar power tower is equivalent to a circular Fresnel reflector. The working fluid in the fixed receiver is heated to between 500-1000° C. and then used as a heat source for a power generation or energy storage system. An advantage of the solar tower is that the individual reflectors can be adjusted, rather than the whole tower being repositioned. Solar power towers are presently of great interest, as they offer higher efficiency and better energy storage capability than the older parabolic trough reflector technology. However, solar power tower development is presently far less advanced. Further, such systems would have to be modified for rotation about multiple axes, rather than the single axis rotation typically used with parabolic trough reflectors.

Thus, a solar heating apparatus solving the aforementioned problems is desired.

SUMMARY

The solar heating apparatus includes at least one optical element and a drive assembly for selectively moving the at least one optical element along multiple axes of rotation, the drive assembly having an elevation shaft and an azimuth rotation shaft. The solar heating apparatus also includes a support frame positioned in communicating relation with the drive assembly, the support frame being configured for supporting the at least one optical element. The support frame includes a main shaft, at least one branch holder pivotally attached to an end of the main shaft, the at least one branch holder being adapted for supporting the at least one optical element, and at least one belt drive for pivoting the at least one branch holder, the at least one belt drive being actuated by the elevation shaft. The at least one branch holder can include at least one connecting joint for supporting the at least one optical element.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 2:
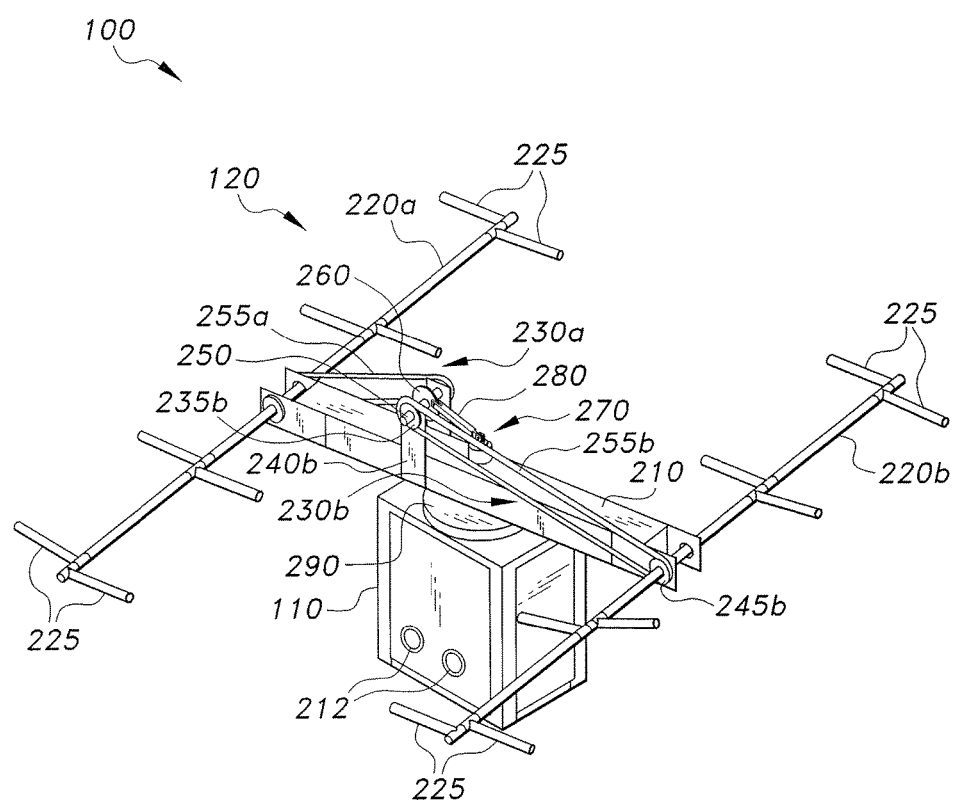
FIG. 2 is a perspective view of the solar heating apparatus of FIG. 1, shown with the mirrors removed.
Figure 3:
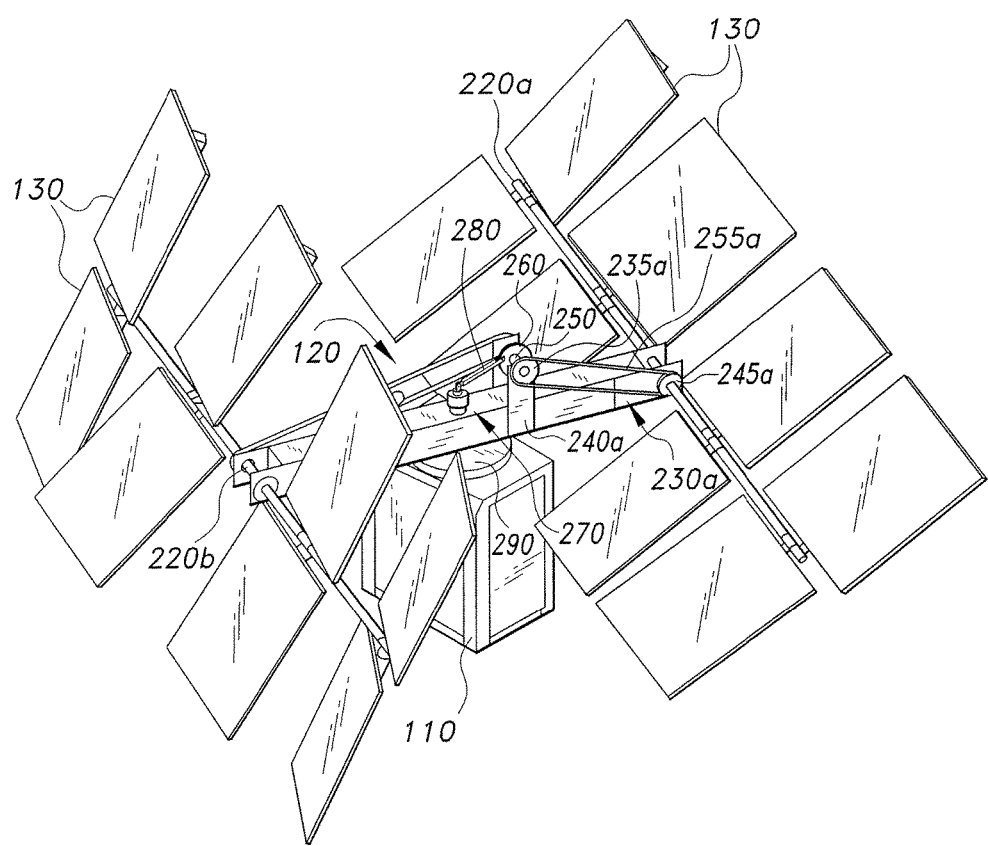
FIG. 3 is a perspective view of the solar heating apparatus of FIG. 1, shown with the mirrors in an upward elevation position.
Figure 4:
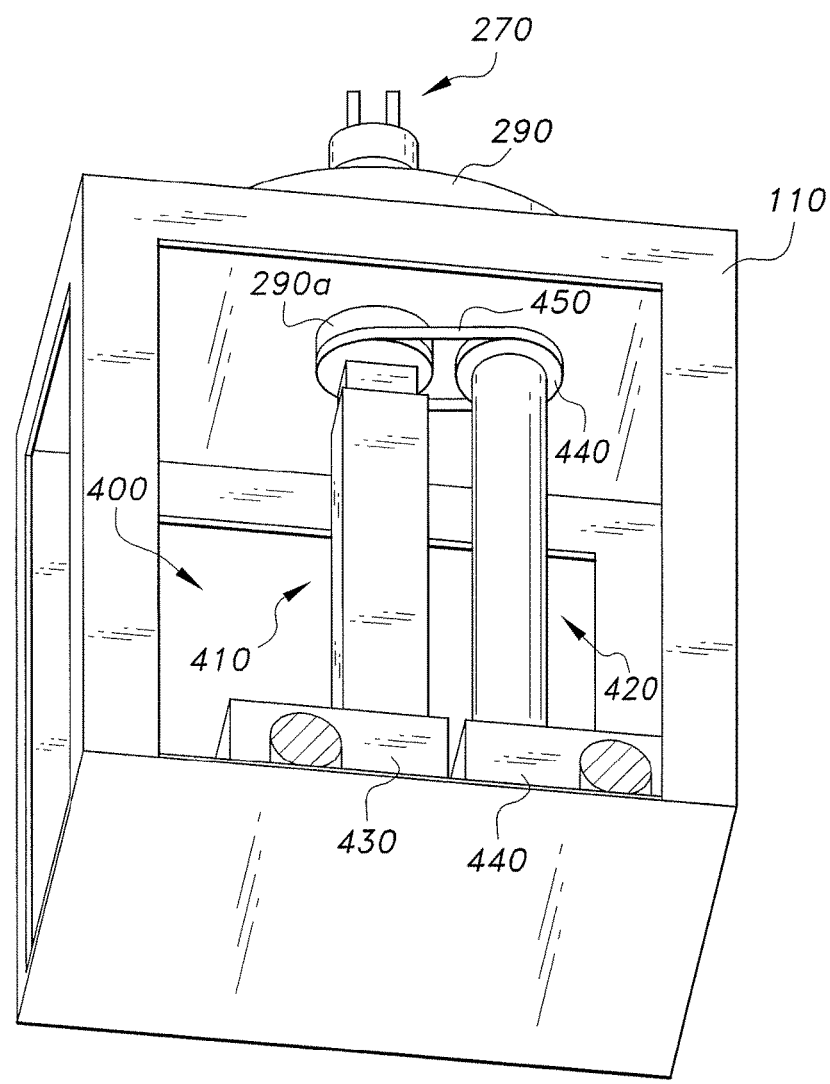
FIG. 4 is a perspective view of the housing of the solar heating apparatus of FIG. 1, shown from below and with panels removed from the sidewalls.
Figure 5:
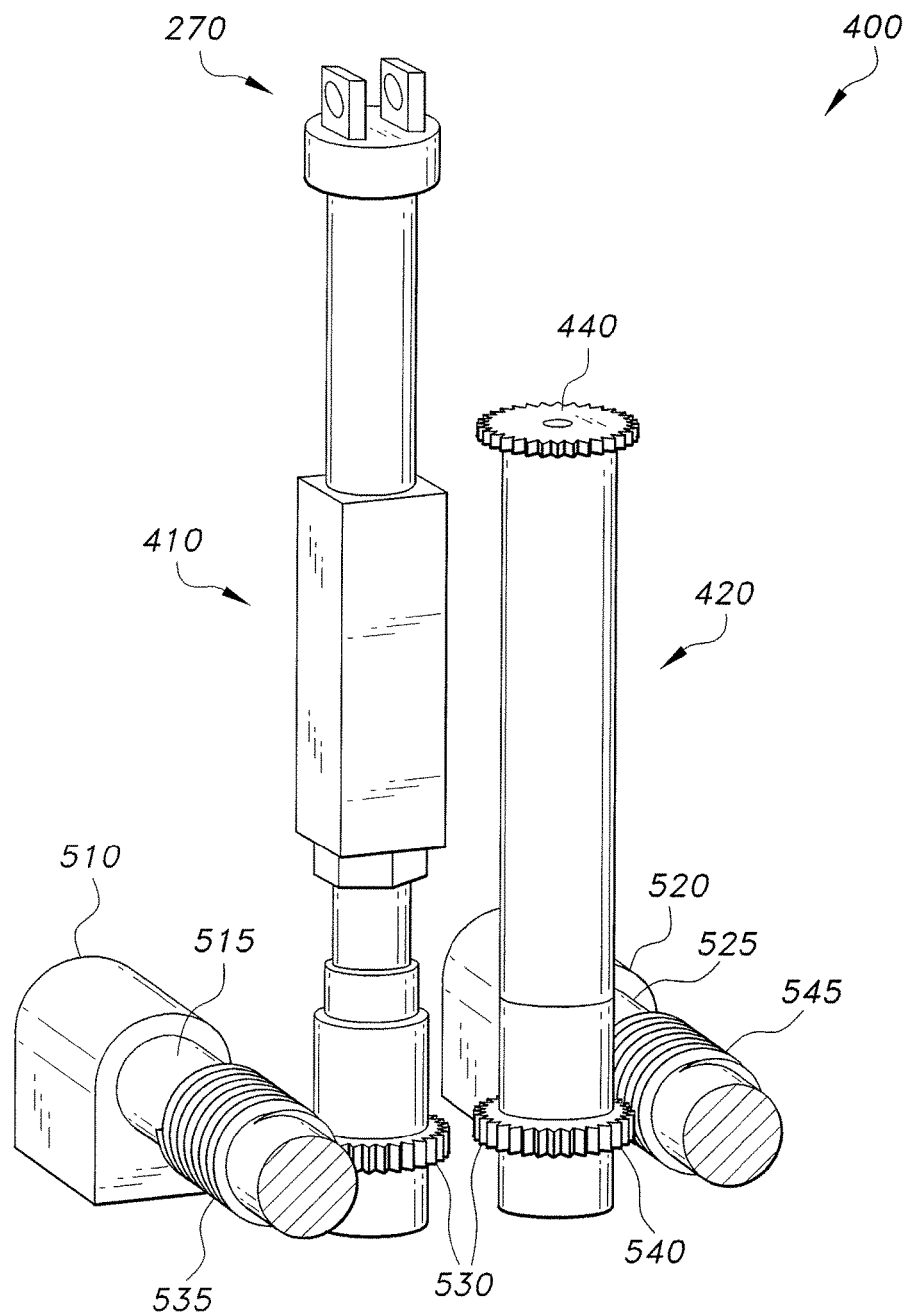
FIG. 5 is a perspective view of the drive assembly of the solar heating apparatus of FIG. 1, shown with the housing omitted.

Referring to FIGS. 1-5, a first embodiment of a solar heating apparatus, generally designated as 100, configured for concentrating solar radiation SR on a fixed receiver R is diagrammatically illustrated. The solar heating apparatus 100 includes a housing 110, a drive assembly 400 (shown in FIG. 5) disposed within the housing 110, a support frame 120 positioned in communicating relation with the drive assembly 400, and a plurality of optical elements 130, such as mirrors or a lenses, suitable for reflecting solar radiation SR onto the fixed receiver R, each of the plurality of optical elements 130 being mounted on the support frame 120. Referring to FIGS. 4 and 5, the drive assembly 400 includes an elevation shaft 410 operatively engaged with an elevation motor 510 via a transmission shaft 515 and an azimuth rotation shaft 420 operatively engaged with a rotation motor 520 via a transmission shaft 525. The drive assembly 400 is configured for selectively and controllably moving the support frame 120, and in turn, the optical elements 130 along two axes of rotation to track the sun's S azimuth and elevation.

The support frame 120 of the solar heating apparatus 100 may be formed from any suitable lightweight material, such as aluminum and aluminum alloys. As shown in FIG. 2, the support frame 120 includes a main shaft 210, a first branch holder 220a pivotally attached to one end of the main shaft 210, and a second branch holder 220b pivotally attached to the other end of the main shaft 210, and a plurality of belt drives, including a first belt drive 230a configured for rotating the first branch holder 220a and a second belt drive 230b configured for rotating the second branch holder 220b.

Figure 1:
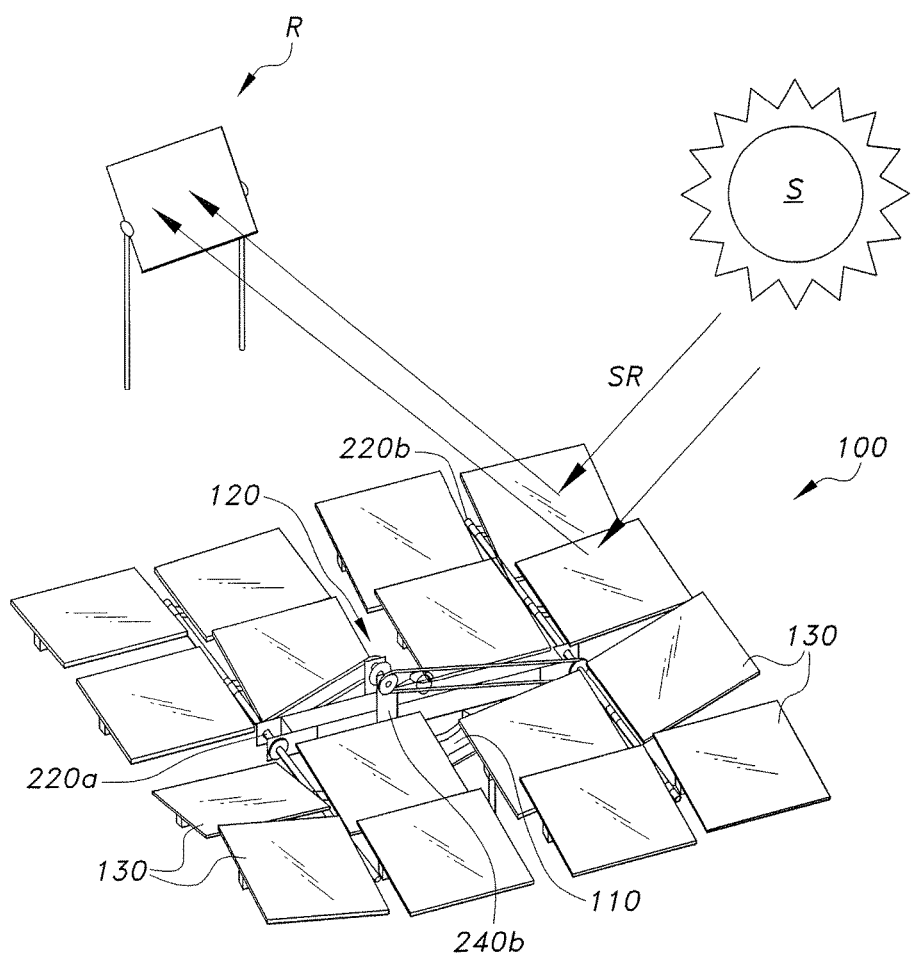
FIG. 1 is an environmental perspective view of a first embodiment of a solar heating apparatus.

The main shaft 210 includes a first extension member 240a and a second extension member 240b, one end of each extension member 240a, 240b being attached to the main shaft 210. A pin 250 extends through the opposing end of each extension member 240a, 240b, as illustrated in FIGS. 1, 2, and 3. Both extension members 240a, 240b are positioned adjacent to one another on opposing sides of the main shaft 210 and extend vertically in the same direction from the main shaft 210, the extension members 240a, 240b being parallel to one another.

Each branch holder 220a, 220b includes a plurality of individually adjustable connector joints 225, each connector joint 225 being configured for supporting a corresponding one of the plurality of optical elements 130. Each connector joint 225 is pivotally connected to one corresponding branch holder 220a, 220b such that the connector joint 225 may be adjusted in a forward or backward direction and/or rotated in a left or right direction, in order to focus the corresponding optical element 130 of the solar heating apparatus 100 at the fixed receiver R. Once each connector joint 225 has been adjusted so that the corresponding optical element 130 is directed towards the fixed receiver R, the connector joint 225 may be selectively locked via any suitable type of locking mechanism known in the art in order to fix the connector joint 225 and substantially prevent any accidental or unnecessary movement of the optical element 130.

The first belt drive 230a includes a drive sprocket 235a mounted on the portion of the pin 250 extending outward from the first extension member 240a, a tension sprocket 245a positioned on the first branch holder 220a, and an endless chain 255a trained around both sprockets 235a, 245a, such that the first belt drive 230a may pivot (e.g., tilt) the first branch holder 220a in a forward or backward direction so that each of the optical elements 130 on the first branch holder 220a can reflect the solar radiation SR towards the fixed receiver R. The second belt drive 230b includes a drive sprocket 235b positioned on the opposing end of the pin 250 extending outward from the second extension member 240b, a tension sprocket 245b positioned on the second branch holder 220b, and an endless chain 255b trained around both sprockets 235b, 245b such that the second belt drive 230b may pivot (e.g., tilt) the second branch holder 220b in a forward or backward direction. It is to be noted that the drive sprockets 235a, 235b of each belt drive 230a, 230b are positioned coaxially on the pin 250, such as on opposing ends of the pin 250, extending through each extension member 240a. 240b, as illustrated in FIGS. 1, 2, and 3. A wheel 260 is centrally positioned on the pin 250 between the drive sprockets 235a, 235b, the wheel 260 being configured to rotate the pin 250 and, in turn, drive each drive sprocket 235a, 235b in a given direction, such as in a clockwise or counter-clockwise direction, in order to rotate the corresponding tension sprocket 245a, 245b, and pivot (i.e. tilt) the corresponding branch holder 220a, 220b towards the sun, as discussed further below.

One end of the elevation shaft 410 of the drive assembly 400 extends through the main shaft 210 of the support frame 120 and includes a bracket attachment 270, and the other end of the elevation shaft 410 is operatively engaged to an elevation motion gear 530. The elevation motion gear 530 is operatively engaged to an elevation motion worm 535 driven by the elevation motion motor 510. Once actuated, the elevation motor 510 may rotate the elevation motion worm 535 that, in turn, may rotate the elevation motion gear 530 to move the elevation shaft 410 in a vertical direction by a jack screw mechanism to re-orient each of the plurality of optical elements 130. The elevation motion gear 530 and the elevation motion worm 535 may be housed within an elevation jack gear box 430 and may be any suitable type of worm gear drive known in the art.

The bracket attachment 270 of the elevation shaft 410 is pivotally attached to the wheel 160 disposed on the pin 150 via an attachment member 280, such as a torque link. Accordingly, any movement of the elevation shaft 410 in an upward or downward direction rotates the wheel 160 and in turn, the drive sprocket 235a, 235b of each corresponding belt drive 230a, 230b in a corresponding clockwise or counter-clockwise direction. Any rotation of the drive sprocket 235a, 235b of each corresponding belt drive 230a, 230b, in turn, rotates the corresponding tension sprocket 245a, 245b and pivots (i.e., tilts) the corresponding branch holder 220a, 220b in a forward or backward direction to compensate for the movement of the sun S.

As shown in FIGS. 4-5, one end of the azimuth rotation shaft 420 of the drive assembly 410 includes a sprocket 440 operatively engaged to an azimuth motion circular plate 290, such as to a bottom portion 290a of the azimuth motion circular plate 290 extending through the top wall of the housing 110, via an endless chain 450. The opposing end of the azimuth rotation shaft 420 is operatively engaged to a rotation motion gear 540. It is to be noted that a dust seal (not shown) may be inserted between the top portion of the housing 110 and the Azimuth motion circular plate 290 to substantially prevent any foreign particles or dust from accumulating beneath the azimuth motion circular plate 290. The azimuth motion circular plate 290 is attached to the main shaft 210 of the support frame 120, such that the rotation of the azimuth motion circular plate 290 may rotate the support frame 120 in a corresponding direction. The rotation motion gear 540 is operatively engaged to a rotation motion worm 545 that is driven by the rotation motor 520. The rotation motion worm 545 is adapted for rotating the rotation motion gear 540 in a clockwise or counter-clockwise direction. For example, once actuated, the rotation motor 520 may rotate the rotation motion worm 545 in a given direction. The rotation of the rotation motion worm 545 may, in turn, rotate the rotation motion gear 540 to drive rotation of the azimuth rotation shaft 420, and in turn, the azimuth motion circular plate 290 in a corresponding clockwise or counter-clockwise direction to allow each optical element 130 to rotate in the azimuth direction to track the motion of the sun S during the day. Similar to the elevation motion gear 530 and the elevation motion worm 535, the rotation motion gear 540 and the rotation motion worm 545 may be housed within a rotation gear box 440.

The housing 110 can be a container, such as a box or any other suitable type of container suitable for keeping dust from sticking to the moving parts and for making cleaning the solar heating apparatus 100 straightforward and simple. The front and rear sides of the housing 110 may have two openings 212 so that the transmission shafts 515 and 525 may engage the gears 530 and then pass through the housing 110 to engage similar gears in successive housings 110 in an array of reflectors.

Figure 6:
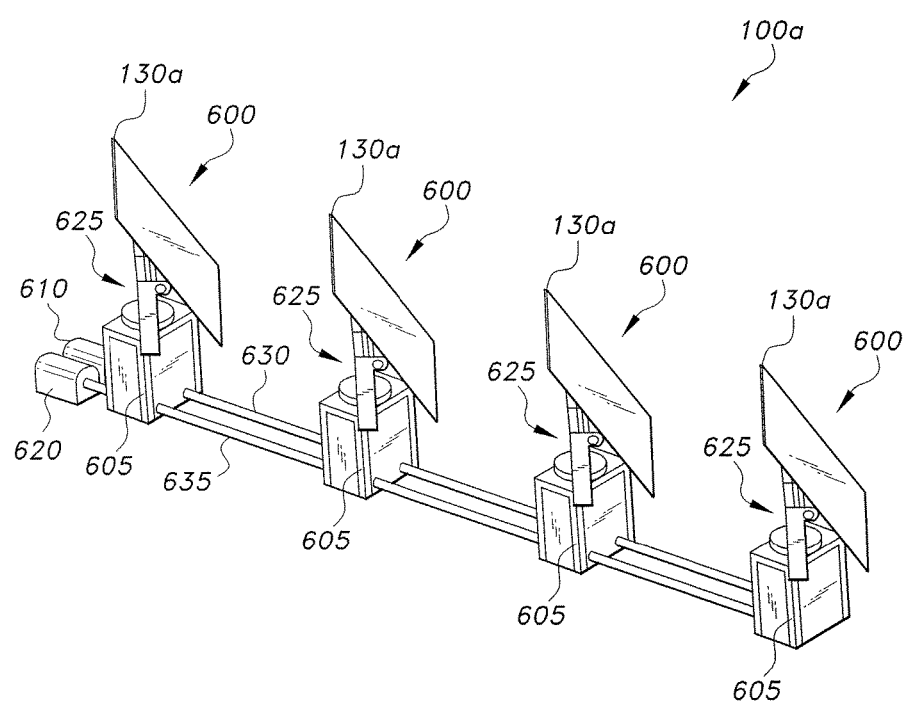
FIG. 6 is a perspective view of a second embodiment of a solar heating apparatus.
Figure 7A:
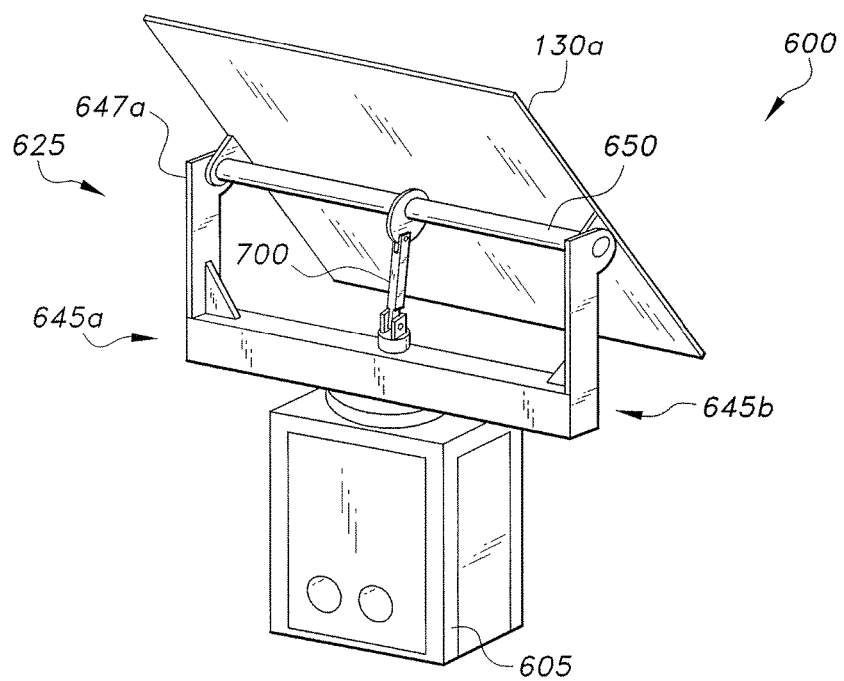
FIG. 7A is a perspective view of a single mirror assembly of the solar heating apparatus of FIG. 6.
Figure 7B:
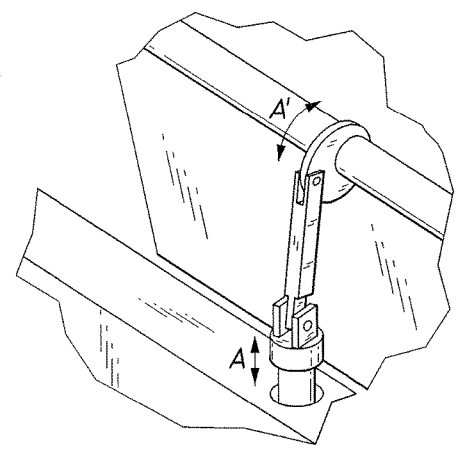
FIG. 7B is a partial perspective view of a mechanism for adjusting tilt of the mirrors of the apparatus of FIG. 6 to track elevation of the sun.

FIGS. 6-7B depict another embodiment of a solar heating apparatus, generally designated as 100a, configured for concentrating solar radiation SR on a fixed receiver R. The solar heating apparatus 100a is substantially similar to the solar heating apparatus 100, described herein. However, the solar heating apparatus 100a includes a plurality of individual solar units 600 arranged in series. Each solar unit 600 is operatively engaged to an elevation motor 610 and an azimuth rotation motor 620 in a similar fashion to the solar heating apparatus 100.

Each solar unit 600 includes a housing 605, a drive assembly 400 disposed within the corresponding housing 605, and a support frame 625 disposed in communicating relation with the drive assembly 400. Unlike the support frame 120 of the solar heating apparatus 100, the support frame 625 of the solar heating apparatus 100s is adapted to support a single optical element (mirror) 130a. The drive assembly in the solar heating apparatus 100a is identical to the drive assembly 400 in the heating assembly 100 described herein. Accordingly, the drive assembly of the solar heating assembly 100a is configured for selectively and controllably moving the corresponding optical element 130a along two axes of rotation to track the sun's azimuth and elevation.

Unlike the support frame 120 of the solar heating apparatus 100, the support frame 625 of the solar heating apparatus 100a forms a U-shaped configuration wherein the support frame 625 includes a main shaft having a first end 645a including an upward extending vertical member 647a and an opposing second end 645b including an upward extending vertical member 647b. The vertical members 647a, 647b rotatably support the ends of a shaft 650 extending between the vertical members 647a, 647b. The optical element 130a, such as a mirror or lens, is rigidly attached to the shaft 650 of the support frame 625 for rotation therewith.

Unlike the elevation shaft 410 of the drive assembly 400 in the solar heating apparatus 100, the elevation shaft of the drive assembly of the solar heating apparatus 100a is connected directly to the shaft 650 via an attachment member 700, such as a torque link, pivotally mounted on the shaft 650 of the support frame 625 to control the orientation of the optical element 130a. For example, when the elevation shaft is retracted, in an identical fashion as the elevation shaft 410 described herein, the optical element 130a may move upward, thereby increasing the elevation angle of the optical element 130a. Conversely, when the elevation shaft is extended, in an identical fashion as the elevation shaft 410 described herein, the optical element 130a may move downward, thereby decreasing the elevation angle of the optical element 130a. The upward and downward movement attachment member 700 as the elevation shaft is being extended or retracted is illustrated by arrow A in FIG. 7B. Rotation of the shaft 650 and subsequent range of motion of the optical element 130a in the solar heating apparatus 100a is illustrated by arrow A' in FIG. 7B. The support frame 625 is rotated in the same manner as the support frame 120 is rotated in the solar heating apparatus 100 described herein around a vertical axis to track changes in the sun's azimuth.

By way of operation, a plurality of solar units 600 are arranged in series along a transmission shaft 630 connecting each of the plurality of solar units to the elevation motor 610 and along a transmission shaft 635 connecting each of the plurality of solar units to the rotation motor 620, as described above. Activation of the elevation motor 610 retracts and/or extends the elevation shaft to either increase or decrease the elevation angle of each optical element 130a, and activation of the rotation motor 620 rotates the support frame 625 and the corresponding optical element 130a in a clockwise or counter-clockwise direction to compensate for the movement of the sun S.

It will be understood that the worm gear assembly described herein is a means to translate rotational motion in a perpendicular direction. Other means to do so, e.g., bevel gears, may be used, where appropriate.

It is to be understood that the solar heating apparatus is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A solar heating apparatus, comprising:
   at least one optical element;
   a drive assembly configured for selectively moving the at least one optical element along multiple axes of rotation, the drive assembly having an elevation shaft and an azimuth rotation shaft;
   a support frame positioned in communicating relation with the drive assembly, the support frame having:
     a main shaft having a first extension member, a second extension member, an a pin extending between the first extension member and the second extension member;
     a wheel positioned on the pin;
     at least one branch holder rotatably attached to the main shaft, the at least one optical element being mounted on the at least one branch holder; and
     at least one belt drive configured for rotating the at least one branch holder, the at least one belt drive being rotated by the elevation shaft; and
   an azimuth motion circular plate, the main shaft of the support frame being mounted on the azimuth motion circular plate for rotation therewith;
   an azimuth tracking motor driving rotation of the azimuth rotation shaft;
   a rotation motion gear mounted on the azimuth rotation shaft;
   a rotation motion worm gear driven by the rotation motion motor, the worm gear driving the rotation motion gear to rotate the azimuth rotation shaft; and
   an attachment member having one end pivotally connected to the elevation shaft and an opposing end pivotally connected to the wheel.

2. The solar heating apparatus as recited in claim 1, wherein the drive assembly further comprises:
   a sprocket mounted on the azimuth rotation shaft; and
   an endless chain, the endless chain being trained around the sprocket and a portion of the azimuth motion circular plate to drive rotation of the azimuth motion circular plate.

3. The solar heating apparatus as recited in claim 1, further comprising an elevation tracking motor driving rotation of the elevation shaft.

4. The solar heating apparatus as recited in claim 1, wherein the at least one belt drive comprises:
   a drive sprocket mounted on one end of the pin;
   a tension sprocket mounted on the at least one branch holder; and
   an endless chain trained around the drive sprocket and the tension sprocket, the belt drive being configured to rotate the at least one branch holder.

5. The solar heating apparatus as recited in claim 1, wherein the at least one branch holder comprises at least one connecting joint having one end pivotally connected to the at least one branch holder and an opposite end connected to the at least one optical element.

6. The solar heating apparatus as recited in claim 1, further comprising a housing, the drive assembly being disposed within the housing.

7. A solar heating apparatus, comprising:
- a plurality of optical elements;
- a drive assembly configured for selectively moving the plurality of optical elements along multiple axes of rotation, the drive assembly having an elevation shaft and an azimuth rotation shaft, the drive assembly being positioned in communicating relation with each of the optical elements; and
- a support frame including:
  - a main shaft having a first extension member, a second extension member, and a pin extending between the first extension member and the second extension member;
  - a wheel centrally positioned on the pin, the wheel being operatively engaged to the elevation shaft of the drive assembly;
  - at least one branch holder rotatably attached to the main shaft, the at least one branch holder including a plurality of connecting joints having one end pivotally connected to the at least one branch holder and an opposing end connected to one of the plurality of optical elements; and
  - at least one belt drive configured for rotating the at least one branch holder, the at least one belt drive having a drive sprocket mounted on the pin, a tension sprocket mounted on the at least one branch holder, and an endless chain trained around the drive sprocket and the tension sprocket;
  - an azimuth motion circular plate coupled to the main shaft of the support frame;
  - an azimuth tracking motor driving rotation of the azimuth rotation shaft;
  - a rotation motion gear mounted on the azimuth rotation shaft;
  - a rotation motion worm gear driven by the rotation motion motor, the worm gear driving the rotation motion gear to rotate the azimuth rotation shaft; and
  - an attachment member having one end pivotally connected to the elevation shaft and an opposing end pivotally connected to the wheel.

8. The solar heating apparatus as recited in claim 7, further comprising an elevation tracking motor driving rotation of the elevation shaft.

9. The solar heating apparatus as recited in claim 8, further including:
- an elevation motion gear mounted on the elevation shaft, and
- an elevation motion worm gear driven by the elevation motion motor, the worm gear driving the gear mounted on the elevation shaft.

10. The solar heating apparatus as recited in claim 7, further comprising:
- a sprocket mounted on the azimuth rotation shaft; and
- an endless chain trained around the sprocket and a portion of the azimuth motion circular plate.

11. The solar heating apparatus as recited in claim 7, further including a housing, the drive assembly being disposed within the housing.

* * * * *